(12) United States Patent
VanBlon et al.

(10) Patent No.: US 9,653,073 B2
(45) Date of Patent: May 16, 2017

(54) VOICE INPUT CORRECTION

(71) Applicant: Lenovo (Singapore) Pte. Ltd., Singpore (SG)

(72) Inventors: Russell Speight VanBlon, Raleigh, NC (US); Rod D. Waltermann, Raleigh, NC (US); Suzanne Marion Beaumont, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 274 days.

(21) Appl. No.: 14/089,810

(22) Filed: Nov. 26, 2013

(65) Prior Publication Data

US 2015/0149163 A1 May 28, 2015

(51) Int. Cl.
*G10L 15/00* (2013.01)
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
CPC ......... G10L 15/26; G10L 15/22; G10L 15/19; G10L 17/22; G06F 3/0236; G06F 3/16
USPC ....... 704/231, 235, 236, 251, 257, 260, 270, 704/275, 9
See application file for complete search history.

(56) References Cited

U.S. PATENT DOCUMENTS

| | | | | |
|---|---|---|---|---|
| 4,776,016 A * | 10/1988 | Hansen | ...................... | G06F 3/16 381/110 |
| 5,231,670 A * | 7/1993 | Goldhor | .................... | G06F 3/16 704/275 |
| 5,664,061 A * | 9/1997 | Andreshak | ................ | G06F 3/16 704/231 |
| 5,970,457 A * | 10/1999 | Brant | ...................... | A61B 17/00 704/231 |
| 7,200,555 B1* | 4/2007 | Ballard | .................... | G10L 15/22 704/235 |
| 7,421,390 B2* | 9/2008 | Simpson | .................. | G10L 15/30 704/270 |
| 7,680,661 B2* | 3/2010 | Co | .......................... | G10L 15/22 379/88.01 |
| 8,165,886 B1* | 4/2012 | Gagnon | .................. | G10L 15/19 704/275 |
| 8,620,652 B2* | 12/2013 | Chambers | ................ | G10L 15/22 704/231 |
| 8,793,122 B2* | 7/2014 | White | .................... | G06F 3/0236 369/25.01 |
| 2002/0052746 A1* | 5/2002 | Handelman | ............ | H04N 7/163 704/270 |
| 2005/0261907 A1* | 11/2005 | Smolenski | .............. | G10L 15/22 704/270 |

(Continued)

*Primary Examiner* — Michael Colucci
(74) *Attorney, Agent, or Firm* — Ference & Associates LLC

(57) ABSTRACT

An embodiment provides a method, including: accepting, at an audio receiver of an information handling device, voice input of a user; interpreting, using a processor, the voice input; thereafter receiving, at the audio receiver, repeated voice input of the user; identifying a correction using the repeated voice input; and correcting, using the processor, the voice input using the repeated voice input, wherein the corrective voice input does not include a predetermined voice command. Other aspects are described and claimed.

20 Claims, 3 Drawing Sheets

(56) References Cited

U.S. PATENT DOCUMENTS

| | | | |
|---|---|---|---|
| 2008/0052082 A1* | 2/2008 | Tsai | G10L 15/26 704/275 |
| 2009/0132250 A1* | 5/2009 | Chiang | G06F 17/279 704/251 |
| 2010/0299147 A1* | 11/2010 | Stallard | G10L 15/26 704/235 |
| 2011/0060587 A1* | 3/2011 | Phillips | G10L 15/30 704/235 |
| 2012/0303371 A1* | 11/2012 | Labsky | G10L 13/08 704/260 |
| 2014/0214426 A1* | 7/2014 | Kanevsky | G10L 15/08 704/257 |
| 2015/0120296 A1* | 4/2015 | Stern | G10L 15/30 704/236 |

\* cited by examiner

VOICE INPUT CORRECTION

BACKGROUND

Information handling devices ("devices"), for example laptop computers, tablets, smart phones, e-readers, desktop computers, smart-televisions, etc., may be used to in connection with a voice input interface that converts voice input into machine text. Many different device applications (e.g., all those permitting text input) therefore may utilize voice input if a voice input interface is provided. Common examples include messaging applications (e.g., instant messaging applications, SMS-text messaging applications, email applications), word processing applications, Internet searching applications, navigation applications (either in-vehicle or provided in a handheld or other mobile format), etc. A device will run a voice input interface (speech-to-text or speech recognition engine) as a global service providing an input interface, e.g., similar to a keyboard or touch screen input interface, that may be utilized across applications. Certain applications (or groups thereof) may provide a voice input functionality independently or as an application sub-component or feature.

In any event, the voice input interface sometimes misinterprets the voice input, i.e., the wrong text is input for the corresponding voice input (e.g., command, message content, etc.). A user may manually change or correct the misinterpreted text, e.g., deleting it and re-inputting it. This requires selecting the invalid text and re-speaking or typing the correct text. A user may also select low-confidence text, e.g., words or phrases that the voice input interface indicates may be misinterpreted, and choose replacements from a drop-down list.

BRIEF SUMMARY

In summary, one aspect provides a method, comprising: accepting, at an audio receiver of an information handling device, voice input of a user; interpreting, using a processor, the voice input; thereafter receiving, at the audio receiver, repeated voice input of the user; identifying a correction using the repeated voice input; and correcting, using the processor, the voice input using the repeated voice input, wherein the corrective voice input does not include a predetermined voice command.

Another aspect provides an information handling device, comprising: an audio receiver; a processor; and a memory storing instructions that are executed by the processor to: accept, at the audio receiver, voice input of a user; interpret the voice input; thereafter receive repeated voice input of the user; identify a correction using the repeated voice input; and correct the voice input using the repeated voice input, wherein the corrective voice input does not include a predetermined voice command.

Another aspect provides a product, comprising: a device readable storage device having device readable code stored therewith, the device readable code comprising: code configured to accept, at an audio receiver of an information handling device, voice input of a user; code configured to interpret, using a processor, the voice input; code configured to thereafter receive, at the audio receiver, repeated voice input of the user; code configured to identify a correction using the repeated voice input; and code configured to correct, using the processor, the voice input using the repeated voice input, wherein the corrective voice input does not include a predetermined voice command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
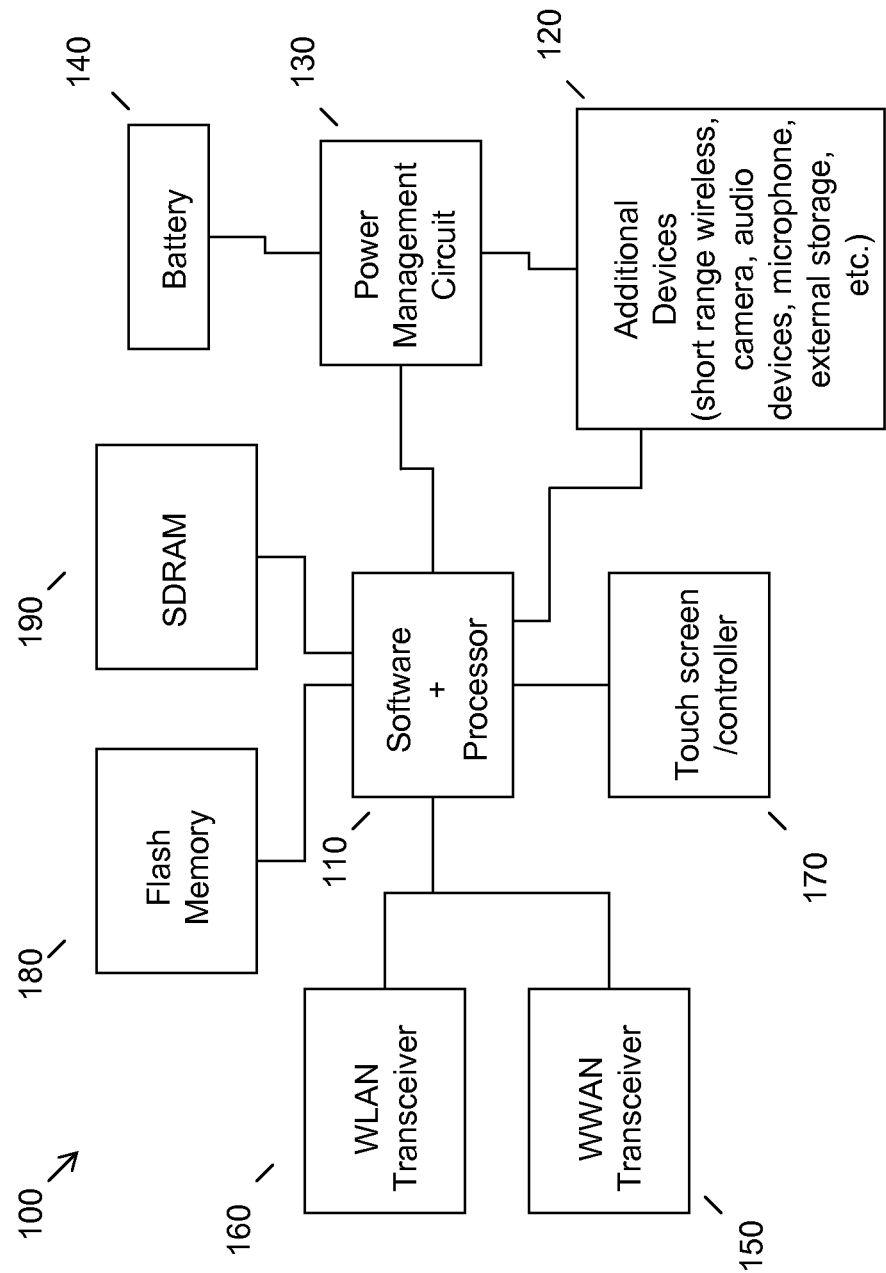
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Voice input interfaces are becoming increasingly popular. While the accuracy of speech-to-text conversion has been improved and continues to improve, inevitably mistakes in the proper conversion of voice input into machine text takes place. Although conventional mechanisms exist for correcting errant input conversions, e.g., manually correcting it or selecting a "best guess" from a drop down menu, each requires a rather intrusive fix that is implemented by the user breaking his or her voice input and intervening manually with the system. Thus, even when a drop down menu is provided, this still requires the user to fix each misinterpretation manually. Moreover, relying on a drop down menu pre-supposes that the voice input interface has correctly identified the word(s) for which errant input may have taken place. That is, some words of the text input may be incorrect and nonetheless not be identified as low-confidence, or vice-versa, by the system. This reduces the chance of quickly fixing every misinterpretation in an intuitive or user friendly manner.

Accordingly, an embodiment provides mechanisms for correcting errant conversion of speech into machine text. An embodiment provides more intuitive mechanisms by which a user may correct voice input mistakes. The mechanisms mimic the way natural communication between users is corrected, e.g., via supplemental voice input that is corrective. For example, according to an embodiment, after speaking (or at a stopping point), the user may speak corrective input to correct the previous voice input. This makes the correction fit seamlessly within the interface of choice (i.e., voice) and is a more natural or intuitive way for correcting speech.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example an audio receiver such as a microphone for receiving voice inputs to a voice input interface. A microphone includes components such as a transducer or sensor that converts sounds into an electrical signal based on electromagnetic induction, capacitance change, piezoelectric generation, or other modulation to produce an electrical signal (voltage) from mechanical vibration produced by sound or acoustic waves. Commonly, system 100 will include a touch screen 170 for data input and display/rendering. System 100 also typically includes various memory devices, for example flash memory 180 and SDRAM 190.

Figure 2:
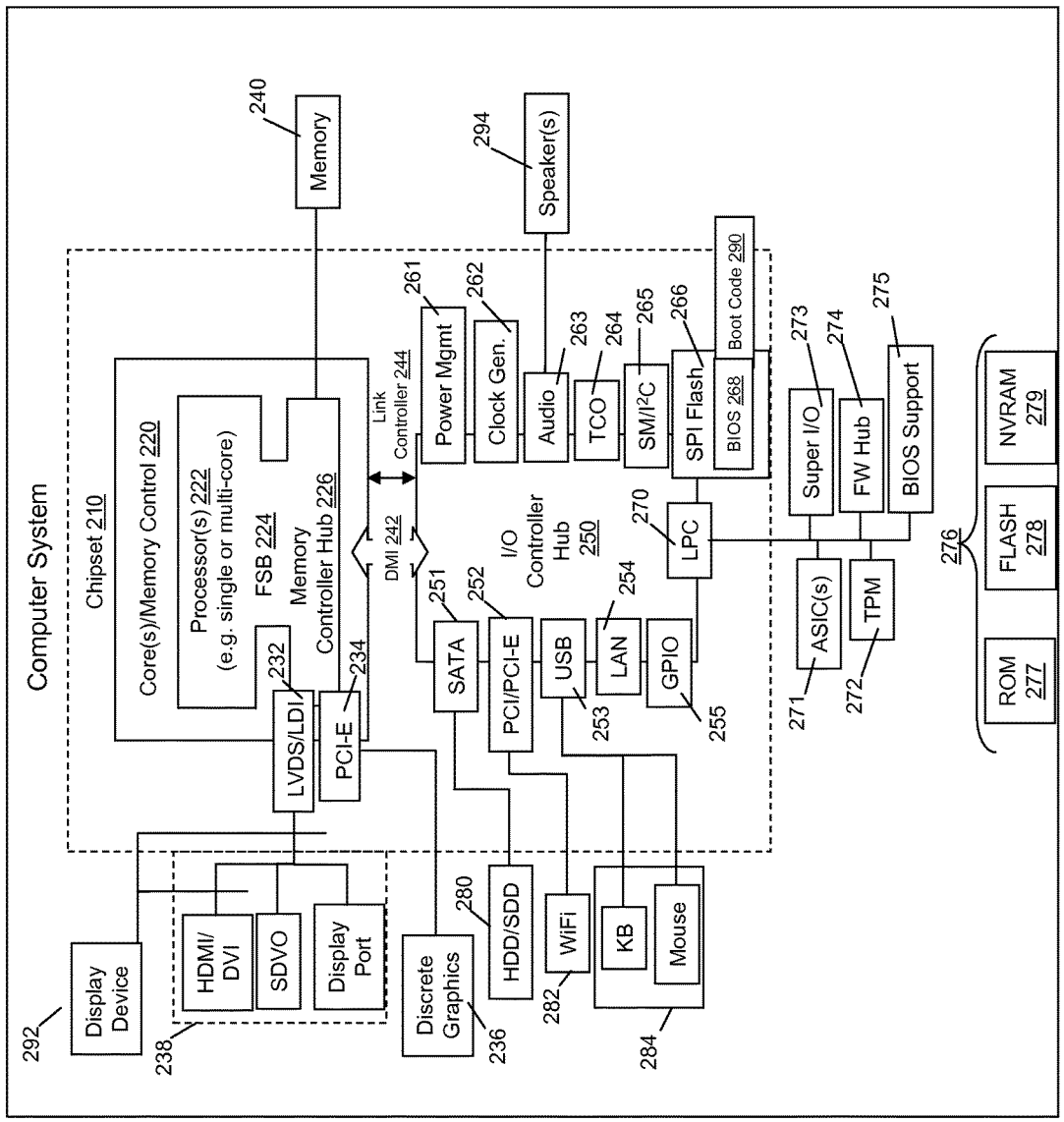
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide a voice input interface. For example, the circuitry outlined in FIG. 1 may be utilized in a device such as a smart phone, tablet, navigation device, automobile console, etc., that accepts voice inputs and converts the same to speech for handing by an underlying application (e.g., word processing application, navigation application, Internet searching application, messaging application, etc.). Likewise, the circuitry in FIG. 2 may be utilized in a device such as a laptop or desktop computer that accepts voice commands or inputs for various applications.

Voice input is received by an audio receiver of a device such as outlined in FIG. 1 and/or FIG. 2. For example, a user may provide a voice command to a smart phone or tablet device that is received by a microphone of the device. The received audio is processed, e.g., converted to digital signal, and analyzed by the voice input interface or component thereof, e.g., a speech recognition engine. Various speech recognition engines exist. The speech recognition engine analyzes various characteristics represented by the audio signal of the speech input.

For example, blocks or segments within the audio signal of speech may be parsed to identify word boundaries. The words themselves may then be analyzed for identification of phonemes indicative of a particular word. Words are commonly identified based on a confidence metric, e.g., confidence of match to a known word or words based on characteristics within the audio signal. In an embodiment, any such speech recognition engine may be utilized. In this respect, various data sources, either stored locally and/or accessed remotely, may be used for comparison and analysis purposes by the speech recognition engine.

In some speech recognition engines, once the word(s) themselves have been identified, at least initially, higher order and/or additional pass analyses may be conducted to improve the accuracy. For example, grammar and syntax of the words identified, and the ordering thereof, may be analyzed to determine if the word(s) have been identified properly given the context in which they were presented. Moreover, the speech input may be parsed to identify various component parts having different functionality associated therewith, e.g., predetermined commands vs. message content.

As mentioned above, a common consequence of this process is that a word is misidentified in the processing of the voice input and conversion thereof. For example, in a messaging application accepting input from a voice input interface, a user may speak the following phrases: "Text Bob" followed by "What time is the game." While the actual spoken input includes the word "time", a speech input interface may misinterpret this word and choose a word that sounds similar (and therefore is similar to the speech recognition engine). For example, this text may be interpreted as "What dime is the game."

Conventionally, faced with such an interpretation, the user may manually go back and correct the word "dime", e.g., by touching it/clicking on it via a touch input interface and typing the correct word "time" in, etc. Or, in some voice input interfaces, the speech recognition engine may have assigned "dime" as a low confidence match such that the user need only touch the word "dime" and select from pre-determined matches, one of which may include "time". Again, this assumes that the speech recognition has assigned a low confidence to the word "dime" and that the correct word "time" has been included in the drop down list of candidate corrections.

An embodiment takes a different approach that more closely matches how users communicate with one another. For example, if user A had said to user B "Text Bob" followed by "What time is the game" and user B, having not heard it clearly, may query back to user A "Text Bob" followed by "What dime is the game". User A may reply: "No, Time". Thus, user A lets user B know the nature of the location of the mistake, "time" not "dime", provides the correction easily, e.g., include the correction "time" in the corrective input, and uses the same mode of communication, i.e., speaks "time" rather than writing it down manually for user B.

Figure 3:
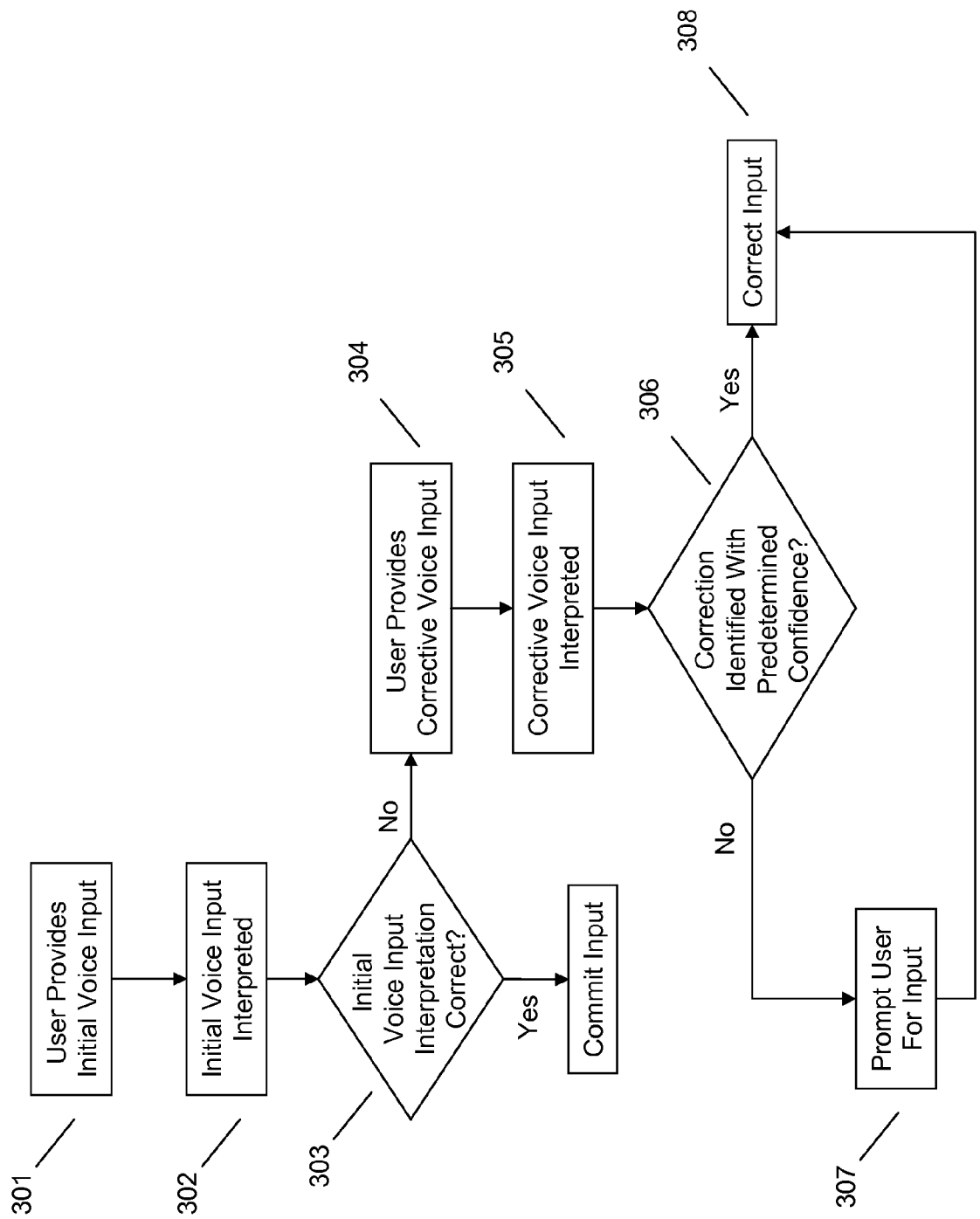
FIG. 3 illustrates an example method of using corrective voice input to correct voice inputs.

Accordingly, an embodiment provides a mechanism by which a user may provide corrective audio input to correct mistaken speech-to-text conversions in a voice input interface. For example, using the illustrative phrases above and referring to FIG. 3, a user may first attempt to interface with a device via providing an initial voice input at 301 of "Text Bob" followed by "What time is the game." In a prefect interpretation at 302, this voice input is received, converted to digital data, parsed into phrases, i.e., command phrase "text contact X", where "X" is Bob, and a message phrase, i.e., the communication or message content "What time is the game".

However, assuming that an error has occurred, e.g., "time" has been misconstrued as "dime", and has not been corrected by a more complex analysis, e.g., syntax error analysis, grammar analysis, etc., the incorrect phrase "what dime is the game" will be loaded into the SMS text message content, rather than the correct "What time is the game".

An embodiment may therefore determine that an error has occurred at 303. For example, an embodiment may perform an analysis and assign low confidence value(s) to one or more words indicating a possible error. Additionally or in the alternative, the error may simply be indicated to the user, e.g., displayed on a display device of whatever form factor is being utilized, e.g., tablet, smart phone, etc., and/or audibly communicated back to the user. Thus, the user himself or herself may simply recognize that a mistake has occurred. In this context, an embodiment may determine that an error has occurred by receiving corrective voice input at 304, as further described herein. In contrast to conventional systems, a user may simply supply corrective audio or voice input to amend the error; here the message content's inclusion of the word "dime".

Thus, a user provides a corrective voice input at 304, e.g., a command phrase followed by a corrective action phrase. For example, a user speaks the words "No" and "Time" to provide the corrective voice input. An embodiment analyzes or interprets this audio at 305, e.g., similar to the above scenario for the initial input and/or with additional information, as further described herein. Thus, the first word or words, in this example "No", (which may be predetermined and mapped to corrective commands) are interpreted at 305 as a command phrase. Therefore, an embodiment interprets the identified word "No" as a command and the following word "Time" as the corrective voice input at 305.

By giving the speech recognition engine the command input, the speech recognition engine may be shifted into a corrective mode wherein it attempts to identify the error. By giving the speech recognition engine the corrective voice input, the speech recognition input may quickly identify which portion(s) of the prior/initial input is to be corrected. In this example, "time" and "dime" are closely matched (e.g., as evidence by the initial error). Thus, the corrective input of "Time" may be quickly associated with the word "dime" at 306, e.g., via comparison analysis similar to that used to identify the word "dime" in the first instance. The original misinterpretation, here the word "dime", may be avoided, e.g., by removing the original selection from the candidate word(s) selected for correction at 306. The next highest match word may be selected and input automatically at 308, or an embodiment may iterate through a list of candidate words for further voice interaction with the user at 307 (i.e., the user may listen to the candidate list, e.g., top 5 candidates, and select therefrom, e.g., using voice input).

Accordingly, an embodiment may quickly shift the voice input interface into a correction mode, quickly identify the portion(s) of the prior input to be corrected, and quickly identify the appropriate correction given the corrective voice input. The user is thus able to leverage a more natural mode of correction.

In an alternative embodiment, a user may not need to provide the command phrase within the corrective voice input, e.g., provided at 304, to shift the speech recognition engine into a corrective mode. Rather, other analyses of the voice inputs may be utilized instead.

For example, using the above example phrase of: "Text Bob" followed by "What time is the game", a user may simply notice (e.g., via visual and or audible feedback of the interpretation) that "time" has been misinterpreted as "dime" and restate the incorrectly interpreted word, e.g., after a pause. Thus, faced with the interpretation "What time is the game", the user may simply restate "time". Because of the timing and the content of the corrective voice input, i.e., a speech input of a similar sounding word ("time" for "dime"), the speech recognition engine may identify the word (e.g., as "time" or "dime" or a similar sounding word) and thereafter use this as an indication 1) that corrective action is necessary and 2) as in indication of the incorrect word location in the prior input. Again, an embodiment may automatically identify the word "dime" as being incorrect (or low confidence) and thereafter automatically replace the word "dime" with "time", or query the user for further instructive voice input (e.g., provide a candidate list of corrections, correction locations, etc.).

In an embodiment, the user may provide emphasis or some audible variation to the corrective word as an indication that the speech recognition engine should shift into a corrective mode. Thus, if the user emphasizes the word "time" in the above corrective voice input provided at 304, e.g., using increased amplitude voice input of "TIME", repeated voice input of "time, time, time", or inflected/emphasized phoneme voice input of "Time", these may all be interpreted by an embodiment that the word not only is a corrective input but signifies a corrective input command and/or location for the correction.

As described herein, in the event that the voice input interface cannot identify the correct input with a high degree of confidence at 306, e.g., based on the initial corrective voice input alone, the user may be asked to repeat the corrective input (e.g., the correct word) multiple times, e.g., at 307. This allows an embodiment to process additional voice inputs and to cycle through potential matches as the user repeats the word/phrase. Again, a menu or candidate list may be cycled through using separate voice commands, e.g., "next". Moreover, if a word/phrase is known to be low-confidence, an embodiment may proactively prompt the user to provide corrective input (e.g., repeat a certain word), prior to the user even providing the same at 304. For example, if at 303 an embodiment determines a word is a particularly low confidence match, an embodiment may proactively query the user to provide the corrective input at 304.

As may be appreciated from the foregoing, an embodiment allows a user to provide corrective voice inputs to a voice input interface. This frees the user up to interact with the voice input interface in a more natural and intuitive manner. Moreover, the corrections may be initiated by the user rather than relying on the voice input interface to identify all possible mistakes, making the overall system more accurate and user friendly.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accepting, at an audio receiver of an information handling device, voice input of a user;
interpreting, using a processor, the voice input;
thereafter receiving, at the audio receiver, partially repeated voice input of the user;
dynamically determining, based upon the partially repeated voice input, that a result of the interpreting of the voice input was incorrect;
identifying a correction for a result of the interpreting of the voice input based on the partially repeated voice input; and
correcting, using the processor, the result of the interpreting of the voice input using the partially repeated voice input, wherein the corrective voice input does not include a predetermined voice command.

2. The method of claim 1, further comprising receiving the partially repeated voice input more than once.

3. The method of claim 2, further comprising refining the correction based additional repeated voice input.

4. The method of claim 1, wherein the correcting comprises identifying in the partially repeated voice input an audio characteristic that differs from an audio characteristic of the voice input of the user.

5. The method of claim 4, wherein the correcting further comprises analyzing the audio characteristic of the partially repeated voice input to determine a correction is needed.

6. The method of claim 5, wherein the correcting further comprises analyzing the audio of the partially repeated voice input to determine the correction.

7. The method of claim 5, further comprising displaying an interpretation of the voice input to the user;
wherein the correcting takes place after the displaying.

8. The method of claim 1, further comprising prompting the user for repeated voice input;
wherein the prompting takes place prior to receiving the partially repeated voice input.

9. The method of claim 1, further comprising prompting the user for additional repeated voice input after receiving the partially repeated voice input.

10. The method of claim 1, further comprising inputting corrected voice input to an underlying application running on the information handling device.

11. An information handling device, comprising:
an audio receiver;
a processor; and
a memory storing instructions that are executed by the processor to:
accept, at the audio receiver, voice input of a user;
interpret the voice input to generate an interpretation result;
thereafter receive partially repeated voice input of the user;
dynamically determine, based upon the partially repeated voice input, that a result of the interpreting of the voice input was incorrect;
identify a correction for the interpretation result based on the partially repeated voice input; and
correct the interpretation result of the voice input using the partially repeated voice input, wherein the corrective voice input does not include a predetermined voice command.

12. The information handling device of claim 11, wherein the instructions are further executed by the processor to receive the partially repeated voice input more than once.

13. The information handling device of claim 12, wherein the instructions are further executed by the processor to refine the correction based on additional repeated voice input.

14. The information handling device of claim 11, wherein the instructions executed by the processor to correct comprise instructions that identify in the partially repeated voice input an audio characteristic that differs from an audio characteristic of the voice input of the user.

15. The information handling device of claim 14, wherein the instructions executed by the processor to correct further comprise instructions that analyze the audio characteristic of the partially repeated voice input to determine a correction is needed.

16. The information handling device of claim 15, wherein the instructions executed by the processor to correct further comprise instructions that analyze the audio of the partially repeated voice input to determine the correction.

17. The information handling device of claim 15, wherein the instructions are further executed by the processor to display the interpretation result of the voice input to the user;
wherein the correction of the voice input takes place after the displaying.

18. The information handling device of claim 11, wherein the instructions are further executed by the processor to prompt the user for repeated voice input;
wherein the instructions to prompt the user for repeated voice input are executed by the processor prior to receiving the partially repeated voice input.

19. The information handling device of claim 11, wherein the instructions are further executed by the processor to prompt the user for additional repeated voice input after receiving the partially repeated voice input.

20. A product, comprising:
a device readable storage device having device readable code stored therewith, the device readable code being executable by a processor and comprising:
code that accepts, at an audio receiver of an information handling device, voice input of a user;
code that interprets, using a processor, the voice input to generate an interpretation result;
code that thereafter receives, at the audio receiver, partially repeated voice input of the user;
code that dynamically determines, based upon the partially repeated voice input, that a result of the voice input interpretation was incorrect;
code that identifies a correction for the interpretation result based on the partially repeated voice input; and
code that corrects, using the processor, the interpretation result of the voice input using the partially repeated voice input, wherein the corrective voice input does not include a predetermined voice command.

* * * * *